United States Patent [19]
Lee

[11] Patent Number: 5,501,139
[45] Date of Patent: Mar. 26, 1996

[54] POPCORN MAKER

[75] Inventor: Chiu Y. Lee, New Territories, Hong Kong

[73] Assignee: Chiaphua Industries Limited, New Territories, Hong Kong

[21] Appl. No.: 345,420

[22] Filed: Nov. 21, 1994

[30] Foreign Application Priority Data

Nov. 22, 1993 [GB] United Kingdom .................... 9323984

[51] Int. Cl.$^6$ ...................................................... A23L 1/18
[52] U.S. Cl. .......................................... 99/323.9; 99/323.5
[58] Field of Search ............................... 99/323.9, 323.5, 99/323.7, 323.8

[56] References Cited

U.S. PATENT DOCUMENTS

| | | | |
|---|---|---|---|
| 2,248,812 | 7/1941 | Cretors | 99/323.9 |
| 2,254,271 | 9/1941 | Cretors | 99/323.9 |
| 3,570,388 | 3/1971 | Gottlieb | 99/238.1 |
| 4,072,091 | 2/1978 | Richardson | 99/323.5 |
| 4,138,937 | 2/1979 | DeWeese | 99/323.5 |
| 4,152,974 | 5/1979 | Tienor | 99/323.9 |
| 4,512,247 | 4/1985 | Friedman | 99/323.5 |

*Primary Examiner*—David Scherbel
*Assistant Examiner*—Reginald L. Alexander
*Attorney, Agent, or Firm*—Leydig, Voit & Mayer

[57] ABSTRACT

A popcorn maker has a flap 17 which closes off a passageway 13 to prevent corn, especially unpopped corn, reaching a discharge outlet 14. The flap is balanced in its closed position and is pushed open by any build up of popped corn to allow the corn to be discharged. The flap will then remain open until closed manually.

8 Claims, 3 Drawing Sheets

POPCORN MAKER

The invention relates to popcorn makers. In a popcorn kernels of corn are subjected to a flow of hot air. When the kernels have been heated sufficiently, usually in a few minutes, they burst and form so-called "popcorn" which is served for eating. Some unpopped kernels may be ejected by the bursting of other adjacent kernels or otherwise and, are wasted.

It is an object of the invention to overcome this problem.

According to the invention there is provided a popcorn maker comprising an open topped heating chamber, a passageway for the corn extending from above the container to a discharge outlet, and a closable flap in the passageway which is balanced to close off the discharge outlet and positioned to direct corn back towards the chamber.

The flap may be balanced to remain closed until the passageway between the chamber and the flap is substantially full of popped corn.

The flap is pivotably supported and arranged to remain open automatically whenever it has been pushed open.

An external handle may be provided and connected to the flap to enable manual opening and closing of the flap.

A popcorn maker according to the invention will now be described by way of example with reference to the accompanying diagramatic drawings in which.

Figure 1:
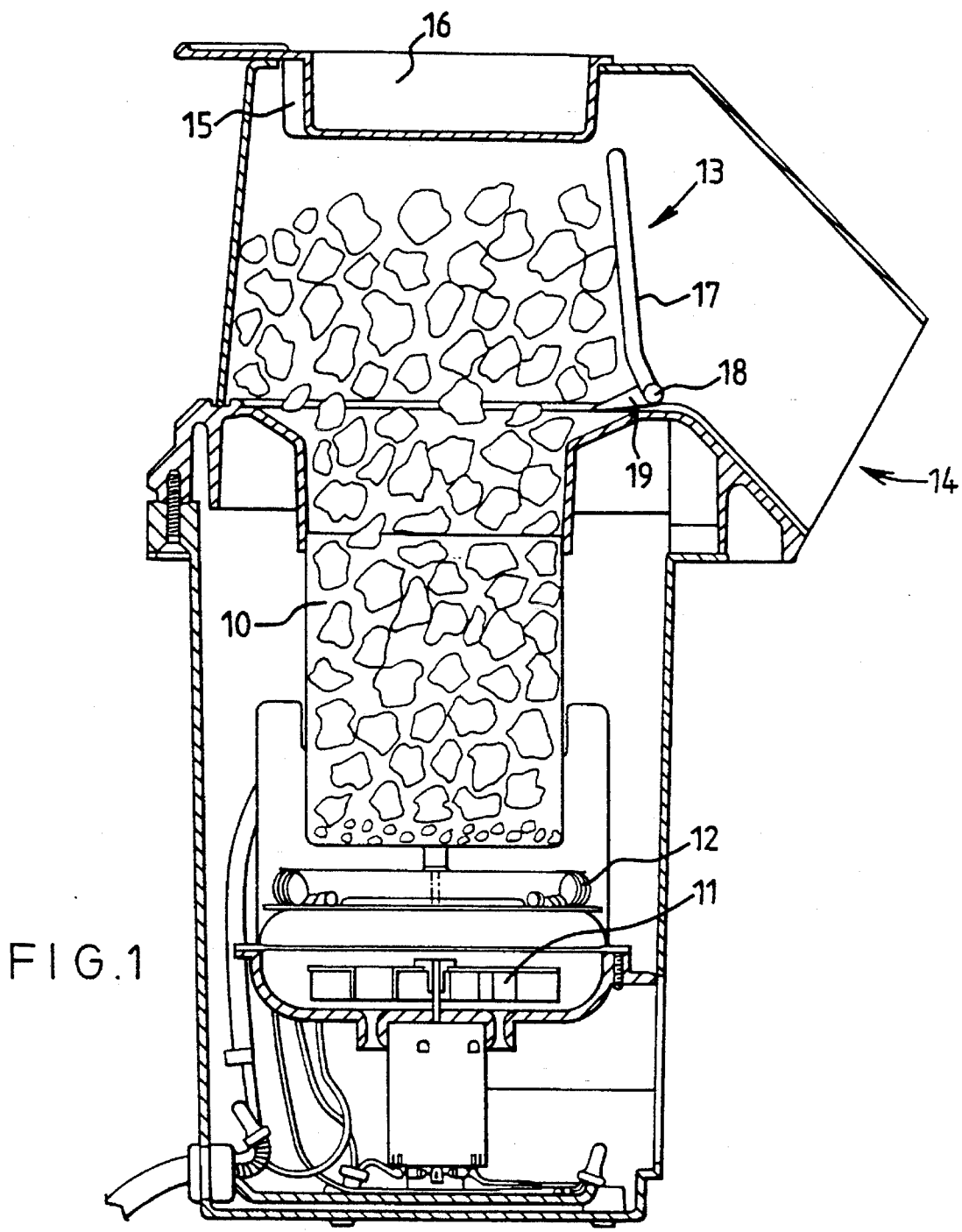
FIG. 1 is a sectioned side view of the popcorn maker with a flap which is closed.

Referring to the drawings, in FIG. 1 the popcorn maker comprises an open topped heating chamber 10 into which air is blown in use by an electric fan 11 over a heating element 12. A passageway 13 extends from above the chamber 10 to a discharge outlet 14. An opening 15 in the passageway has a removable or hinged lid 16 to allow the chamber to be charged with corn.

Figure 3:
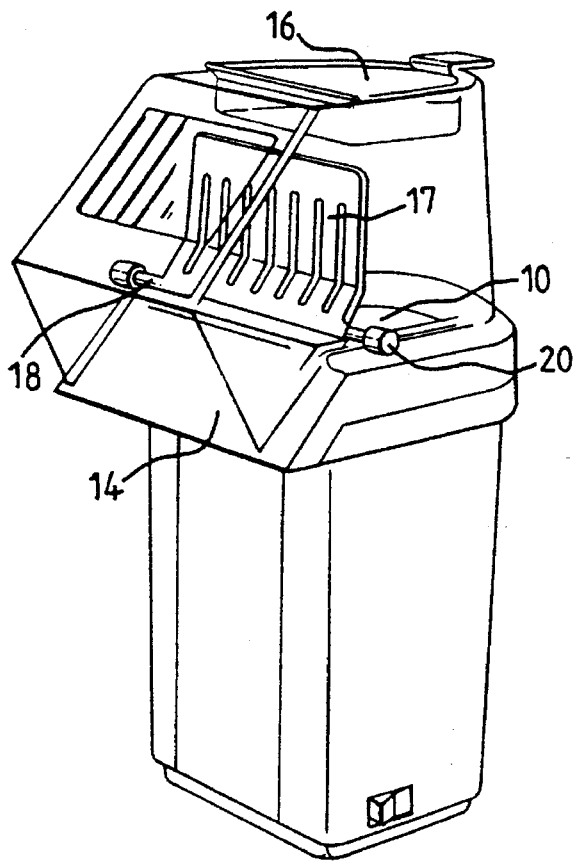
FIG. 3 is an isometric representation of the popcorn maker corresponding to FIG. 1.
Figure 4:
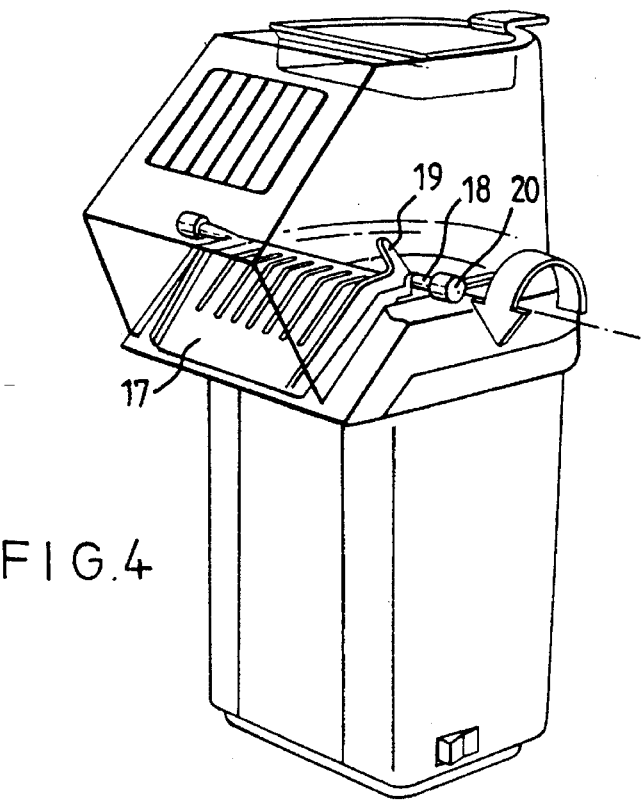
FIG. 4 is an isometric representation of the popcorn maker corresponding to FIG. 2.

A flap 17 extends across the passageway to close off the discharge outlet. The flap 17 is pivotably supported on an axle 18 and is balanced, by gravity, in the position shown in FIG. 1, in its closed position. That is to say, the flap remains in the position shown in FIG. 1 due to its own weight and a short foot 19, rigidly connected to the flap, prevents the flap falling down towards the chamber 10. A handle 20 (see FIGS. 3 and 4) is fixed to the axle so that the flap can be operated manually and moved to its open or closed position, from externally of the popcorn maker.

It will be seen that the lid 16 is formed with an open cavity which can be used as a measuring cup for the corn. The open cavity may also be shaped with a forward projecting spout to facilitate emptying a measured quantity of corn into the chamber 10.

Figure 2:
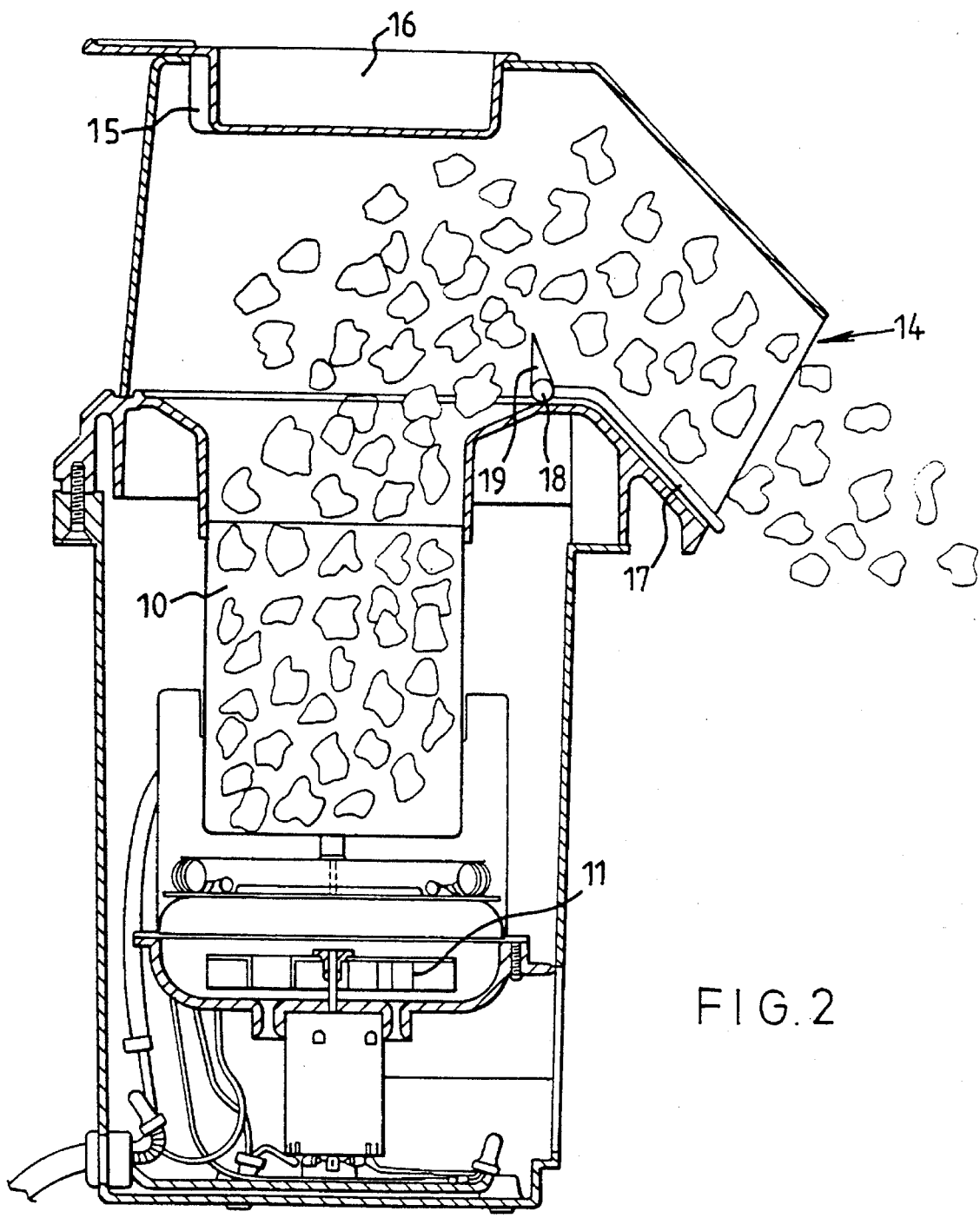
FIG. 2 is a sectional side view of the popcorn maker with the flap which is open.

In use, corn is put in the chamber 10 and when the corn is first heated up by hot air some unpopped kernels may be forced up out of the chamber 10. The kernels will be prevented from reaching the discharge outlet 14 by the flap 17. Any impact forces of these unpopped kernels are well below the force required to push the flap 17 open. However, when all or most of the corn has popped, the popped kernels rises up as shown in FIG. 1 to urge against the flap, and eventually, as in FIG. 2, pushes the flap open. Once the flap has been pushed open, there is no tendency for the flap to close again of its own accord. The flap 17 will remain in the position shown in FIG. 2 until it is manually closed again using the handle 20.

Thus, the flap in FIG. 1 the position shown in prevents wasteful discharge of unpopped corn but responds immediately and automatically to open fully when there is a build up of popped corn inside the passageway. Thus, there is no damage caused by any constrained build up of popped corn inside the passageway which might otherwise blow the lid 16 off, for example.

Where a small quantity of corn is being heated, the popped corn may not rise up sufficiently to open the flap 17. In that case, the flap 17 can be readily and manually opened as necessary.

I claim:

1. A popcorn maker comprising an open topped heating chamber, a passageway for popcorn extending from above the chamber to a discharge outlet, and a pivotably supported closable flap in the passageway which is balanced to close off the discharge outlet and direct corn back towards the chamber when pivoted to a first side of a prescribed position and which is balanced to remain open automatically upon pivoting from the first side to a second side of the prescribed position.

2. A popcorn maker according to claim 1, in which the flap is balanced to remain closed until the passageway between the chamber and the flap is substantially full of popped corn.

3. A popcorn maker according to claim 1, including an external handle connected to the flap to enable manual opening and closing of the flap.

4. A popcorn maker according to claim 1 wherein the flap is pivotable about an axis located in proximity to a lower end of the flap.

5. A popcorn maker according to claim 1 wherein the flap includes a foot for limiting pivoting of the flap towards a closed position.

6. A popcorn maker according to claim 1 wherein the flap is shaped to lie flat against a surface of the discharge outlet when the flap is open.

7. A popcorn maker according to claim 1 wherein the flap is balanced such that the force of popcorn within the passageway is sufficient to pivot the flap past the prescribed position to an open position.

8. A popcorn maker according to claim 1 wherein the flap is balanced to remain open automatically in the absence of popcorn urging the flap open upon pivoting past the prescribed position.

* * * * *